(12) United States Patent
Harada et al.

(10) Patent No.: US 8,542,758 B2
(45) Date of Patent: Sep. 24, 2013

(54) SIGNAL GENERATION DEVICE AND SIGNAL GENERATION METHOD

(75) Inventors: Hiroki Harada, Yokosuka (JP); Hiromasa Fujii, Yokosuka (JP); Shunji Miura, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 255 days.

(21) Appl. No.: 13/037,933

(22) Filed: Mar. 1, 2011

(65) Prior Publication Data
US 2011/0235740 A1 Sep. 29, 2011

(30) Foreign Application Priority Data
Mar. 26, 2010 (JP) ................. 2010-072967

(51) Int. Cl.
*H04K 1/10* (2006.01)
(52) U.S. Cl.
USPC ........... 375/260; 370/203; 370/210; 375/295
(58) Field of Classification Search
USPC ........... 370/203, 343; 375/260, 295; 455/39, 455/91, 130
See application file for complete search history.

(56) References Cited

U.S. PATENT DOCUMENTS

| | | | |
|---|---|---|---|
| 7,738,356 B2 * | 6/2010 | Kim | 370/208 |
| 2004/0008616 A1 * | 1/2004 | Jung et al. | 370/203 |
| 2005/0100109 A1 * | 5/2005 | Nagata et al. | 375/260 |
| 2008/0026704 A1 | 1/2008 | Maeda et al. | |
| 2009/0175159 A1 * | 7/2009 | Bertrand et al. | 370/203 |

OTHER PUBLICATIONS

Paul D. Sutton, et al., "Cyclostationary Signatures in Practical Cognitive Radio Applications", IEEE Journal on Selected Areas in Communications (JSAC), 2008, pp. 1-12.

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

Disclosed is a signal generation device that employs a transmission method using inverse Fourier transform. The signal generation device includes: a modulation unit which modulates transmission data to obtain modulation data; a serial-parallel conversion unit which converts the modulation data input in series to parallel data of a predetermined size smaller than the size of inverse Fourier transform; a duplication unit which selects and duplicates all or a portion of the parallel data to obtain duplication data; a first time-axis shift unit which shifts the duplication data along the time axis to obtain time-axis shift data; and an inverse Fourier transform unit which carries out inverse Fourier transform on the parallel data obtained by the serial-parallel conversion unit and the time-axis shift data obtained by the first time-axis shift unit.

10 Claims, 10 Drawing Sheets

SIGNAL GENERATION DEVICE AND SIGNAL GENERATION METHOD

BACKGROUND OF THE INVENTION

1. Field of the Invention

The present invention relates to a signal generation device and a signal generation method that impart characteristics of second-order cyclostationarity in a communication system that carries out signal identification based on second-order cyclostationarity.

2. Related Background Art

In recent communication systems, communication has come to be carried out by recognizing communication status by gathering information on signals received by a terminal that has received a signal, analyzing the recognized communication status, and using signal transmission parameters that enable the attaining of communication quality (prescribed quality of a communication rate or error rate and the like) that is convenient for or desired by the terminal based on the results of that analysis. Moreover, studies have been conducted on environment recognition communication systems that carry out such communication particularly in the field of wireless communication. In addition, in environment recognition communication systems, gathering of information based on signal demodulation is considered to be typical for recognizing communication status at a terminal.

However, in the case of carrying out communication within the same area in which a plurality of systems is present having different communication methods, since signals cannot be mutually demodulated, although it is possible to recognize the state of "a signal being present" when a signal has been received, there is the problem of being unable to gather any information beyond that.

In contrast, techniques have been attracting attention that focus on signal statistics and gather information on received signals by calculating statistics. Among these techniques, studies have been conducted in particular on second-order cyclostationarity, which has fewer arithmetic operations. Second-order cyclostationarity refers to statistics that generate different characteristics for signals having different parameters, and the use thereof makes it possible to easily identify a plurality of signals having different communication methods. Thus, in the case of carrying out communication within the same area where a plurality of systems having different communication methods is present, in addition to information in the form of "a signal is present", information as to "which signal belonging to which system" can also be obtained when a signal has been received. However, even if this technique is used, there was still the problem of the amount of information obtained being extremely small and being inadequate for recognizing communication status.

Therefore, a technique has been studied that enables a transmitter to impart characteristics of second-order cyclostationarity to a signal to be generated, and to transmit a larger amount of information by means of artificially imparted statistics. Examples of the related art are U.S. Patent Publication No. 2008-0026704 (to be referred to as Reference 1) and P. D. Sutton, K. E. Nolan and L. E. Doyle, "Cyclostationary Signatures in Practical Cognitive Radio Applications", IEEE Journal on Selected Areas in Communications (JSAC), Vol. 26, no. 1, pp. 13-24, 2008 (hereinafter, referred to as Reference 2).

Reference 1 describes a signal generation method in which an ID based on statistics is imparted to a radio signal. Paragraphs 64 to 73 of the specification of Reference 1 describe a radio signal generation method which imparts characteristics of cyclostationarity in a multi-carrier transmission system by transmitting the same symbol for a plurality of predetermined subcarriers. Reference 2 describes a radio signal generation method which imparts characteristics of cyclostationarity by duplicating data transmitted by some of subcarriers at the time of the use of an OFDM (Orthogonal Frequency Division Multiplexing) system and controlling input to inverse Fourier transform to generate transmission signals such that the same data is transmitted by other subcarriers.

The radio signal generation method in Reference 1 and the radio signal generation method in Reference 2 make the transmission signal of a certain carrier identical to a signal transmitted by a subcarrier distant from the relevant subcarrier by a predetermined number of subcarriers, thereby generating signals having characteristics of cyclostationarity corresponding to the predetermined number. However, according to these inventions, since the types of characteristics of cyclostationarity which can be imparted is limited by the total number of subcarriers, there was a problem in that it is difficult to transmit numerous types of information using characteristics of cyclostationarity.

SUMMARY OF THE INVENTION

The invention has been finalized in order to solve the above-described problems, and an object of the invention is to provide a signal generation device and a signal generation method capable of imparting various characteristics of second-order cyclostationarity in a communication system which carries out signal identification based on second-order cyclostationarity.

In order to achieve the above-described object, an aspect of the invention provides a signal generation device that employs a transmission method using inverse Fourier transform. The signal generation device includes: a modulation unit configured to modulate transmission data to obtain modulation data; a serial-parallel conversion unit configured to convert the modulation data input in series from the modulation unit to parallel data of a predetermined size smaller than the size of inverse Fourier transform; a duplication unit configured to select and duplicate all or a portion of the parallel data obtained by the serial-parallel conversion unit, to obtain duplication data; a first time-axis shift unit configured to shift input duplication data along the time axis to obtain time-axis shift data; and an inverse Fourier transform unit configured to carry out inverse Fourier transform on the parallel data obtained by the serial-parallel conversion unit and the time-axis shift data obtained by the first time-axis shift unit.

In the above-described method of the related art, there is no degree of freedom on the time axis. With the above-described signal generation device, the degree of freedom on the time axis can be provided, making it possible to impart various characteristics of second-order cyclostationarity in accordance with the shift amount along the time axis.

The signal generation device may further include a shift amount control unit configured to control the shift amount in the first time-axis shift unit. With this configuration, the shift amount by the first time-axis shift unit is controlled in accordance with characteristics of cyclostationarity to be imparted, making it possible to impart various characteristics of cyclostationarity corresponding to the requirements of the system.

The signal generation device may further include: a phase rotation unit configured to rotate the phase of a signal point at a predetermined rate for the duplication data duplicated by the duplication unit and output the duplication data with the phase rotated to the first time-axis shift unit; and a rotation rate control unit configured to control the rotation rate at which the phase of the signal point is rotated by the phase rotation unit. With this configuration, a frequency shift amount corresponding to the rotation rate at which the phase of the signal point is rotated is set as an additional variation factor, making it possible to impart various characteristics of cyclostationarity.

The first time-axis shift unit may be configured to shift the duplication data along the time axis in terms of samples by applying phase rotation, which differs between subcarriers, to information symbols transmitted by subcarriers in the same symbol for the duplication data duplicated by the duplication unit. With this configuration, it is possible to realize a shift along the time axis in terms of samples and to impart various characteristics of cyclostationarity.

Another aspect for realizing shift along the time axis in terms of samples may provide the following configuration. That is, another aspect of the invention provides a signal generation device that employs a transmission method using inverse Fourier transform. The signal generation device includes: a modulation unit configured to modulate transmission data to obtain modulation data; a serial-parallel conversion unit configured to convert the modulation data input in series from the modulation unit to parallel data of a predetermined size smaller than the size of inverse Fourier transform; a duplication unit configured to select and duplicate all or a portion of the parallel data obtained by the serial-parallel conversion unit, to obtain duplication data; an inverse Fourier transform unit configured to carry out inverse Fourier transform on the parallel data obtained by the serial-parallel conversion unit and the duplication data obtained by the duplication unit; a second time-axis shift unit configured to circularly shift samples after inverse Fourier transform of duplication data to obtain time-axis shift data shifted along the time axis in terms of samples; and a synthesis unit configured to synthesize the time-axis shift data and data after inverse Fourier transform of the parallel data. With this configuration, samples after inverse Fourier transform of the duplication data are circularly shifted to obtain time-axis shift data shifted along the time axis in terms of samples, and the time-axis shift data and data after inverse Fourier transform of the parallel data are synthesized, making it possible to impart various characteristics of second-order cyclostationarity in accordance with the shift amount along the time axis in terms of samples.

The invention relating to the above-described signal generation device can also be grasped to be an invention relating to a signal generation method and can be described as follows. The invention relating to the signal generation method demonstrates the same actions and effects as the invention relating to the above-described signal generation device.

Another aspect of the invention provides a signal generation method which is executed by a signal generation device using a transmission method using inverse Fourier transform. The signal generation method includes: a modulation step of modulating transmission data to obtain modulation data; a serial-parallel conversion step of converting the modulation data obtained in the modulation step to parallel data of a predetermined size smaller than the size of inverse Fourier transform; a duplication step of selecting and duplicating all or a portion of the parallel data obtained in the serial-parallel conversion step, to obtain duplication data; a first time-axis shift step of shifting input duplication data along the time axis to obtain time-axis shift data; and an inverse Fourier transform step of carrying out inverse Fourier transform on the parallel data obtained in the serial-parallel conversion step and the time-axis shift data obtained in the first time-axis shift step.

The signal generation method may further include a shift amount control step of controlling the shift amount in the first time-axis shift step.

The signal generation method may further include: a phase rotation step of rotating the phase of a signal point at a predetermined rate for the duplication data duplicated in the duplication step and outputting the duplication data with the phase rotated to the first time-axis shift step; and a rotation rate control step of controlling the rotation rate at which the phase of the signal point is rotated in the phase rotation step.

In the signal generation method, in the first time-axis shift step, the signal generation device may shift the duplication data along the time axis in terms of samples by applying phase rotation, which differs between subcarriers, to information symbols transmitted by subcarriers in the same symbol for the duplication data duplicated by the duplication unit. With this configuration, it is possible to realize a shift along the time axis in terms of samples and to impart various characteristics of cyclostationarity.

Another aspect of the invention provides a signal generation method which is executed by a signal generation device using a transmission method using inverse Fourier transform. The signal generation method includes: a modulation step of modulating transmission data to obtain modulation data; a serial-parallel conversion step of converting the modulation data obtained in the modulation step to parallel data of a predetermined size smaller than the size of inverse Fourier transform; a duplication step of selecting and duplicating all or a portion of the parallel data obtained in the serial-parallel conversion step, to obtain duplication data; an inverse Fourier transform step of carrying out inverse Fourier transform on the parallel data obtained in the serial-parallel conversion step and the duplication data obtained in the duplication step; a second time-axis shift step of circularly shifting samples after inverse Fourier transform of the duplication data to obtain time-axis shift data shifted along the time axis in terms of samples; and a synthesis step of synthesizing the time-axis shift data and data after inverse Fourier transform of the parallel data.

According to the aspects of the invention, it is possible to impart various characteristics of second-order cyclostationarity in a communication system which carries out signal identification based on second-order cyclostationarity.

DESCRIPTION OF THE PREFERRED EMBODIMENTS

Embodiments of the invention will be described in order with reference to the drawings.

[First Embodiment]

Figure 1:
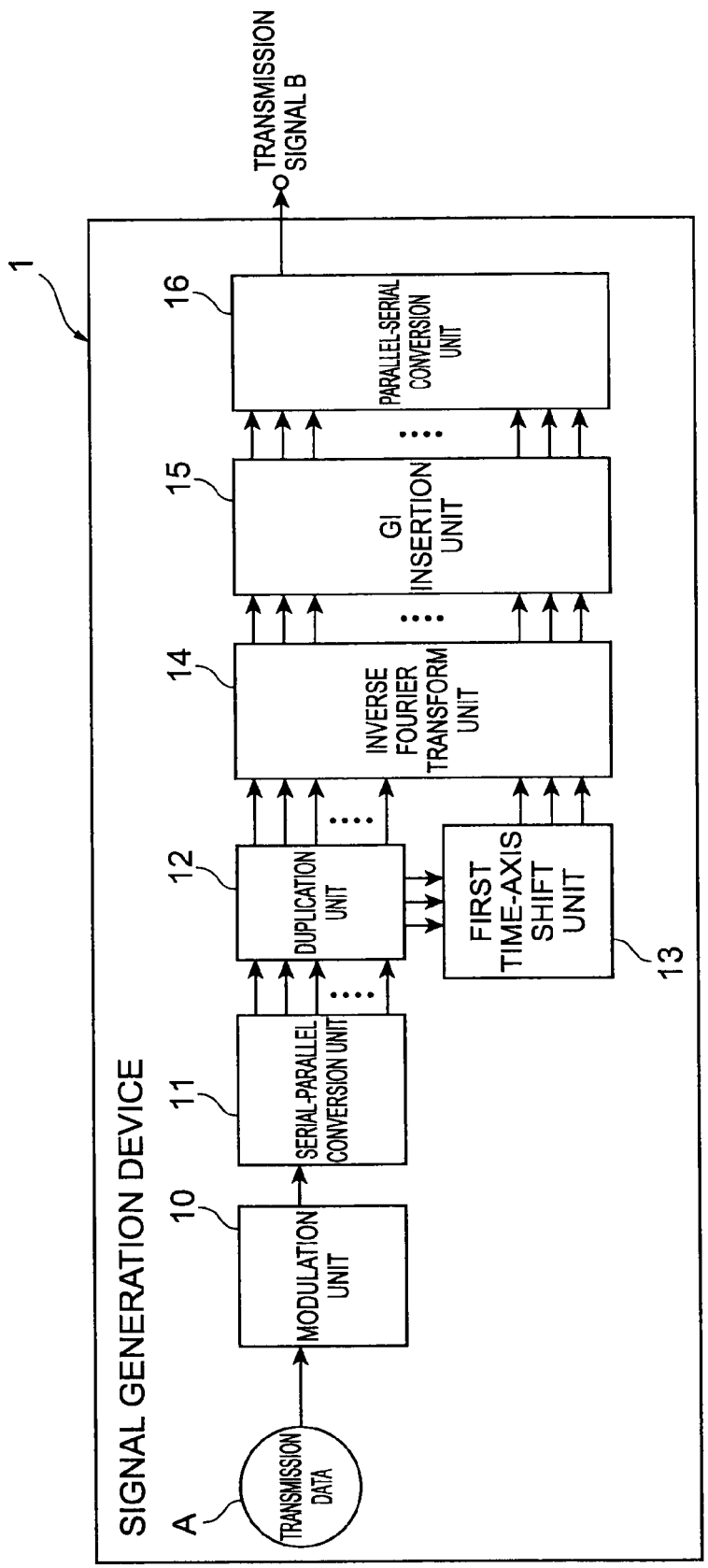
FIG. 1 is a block diagram showing the functional configuration of a signal generation device according to a first and fourth embodiment.

First, the configuration of a signal generation device according to a first embodiment will be described. FIG. 1 is a block diagram showing the functional configuration of a signal generation device 1 according to the first embodiment. As shown in FIG. 1, the signal generation device 1 includes a modulation unit 10, a serial-parallel conversion unit 11, a duplication unit 12, a first time-axis shift unit 13, an inverse Fourier transform unit 14, a GI insertion unit 15, and a parallel-serial conversion unit 16.

Hereinafter, the respective functional elements will be described with reference to FIG. 1.

The modulation unit 10 modulates data A to be transmitted (hereinafter, referred to as "transmission data A") to obtain modulation data. Here, modulation refers to a technique for mapping transmission data on a signal space constituted by an in-phase component and an orthogonal component in accordance with a modulation method, such as phase modulation (BPSK, QPSK, or the like), amplitude modulation (PAM or the like), or quadrature amplitude modulation (QAM). The serial-parallel conversion unit 11 parallel-converts the modulation data obtained by and output in series from the modulation unit 10 to generate parallel data. The duplication unit 12 duplicates all or a portion of row data of a matrix given as the parallel data, to obtain duplication data.

The first time-axis shift unit 13 shifts input duplication data along the time axis to obtain time-axis shift data. Here, as an example, the first time-axis shift unit 13 stores a shift amount corresponding to a predefined imparted statistic in advance and shifts the duplication data along the time axis on the basis of the shift amount.

The inverse Fourier transform unit 14 receives the parallel data output from the serial-parallel conversion unit 11 and the time-axis shift data output from the first time-axis shift unit 13 as an input, carries out inverse Fourier transform on the input signal, and outputs an obtained inverse Fourier transform signal. The GI insertion unit 15 duplicates all elements in a predetermined number of rows from the rightmost (or the leftmost) of the matrix of the inverse Fourier transform signal and connects the duplicated elements to the inverse Fourier transform signal from the left (or right) in the row direction to insert a guard interval (GI), thereby obtaining a GI insertion signal. The parallel-serial conversion unit 16 converts the matrix input as the GI insertion signal to serial data and outputs an obtained transmission signal B.

Figure 2:
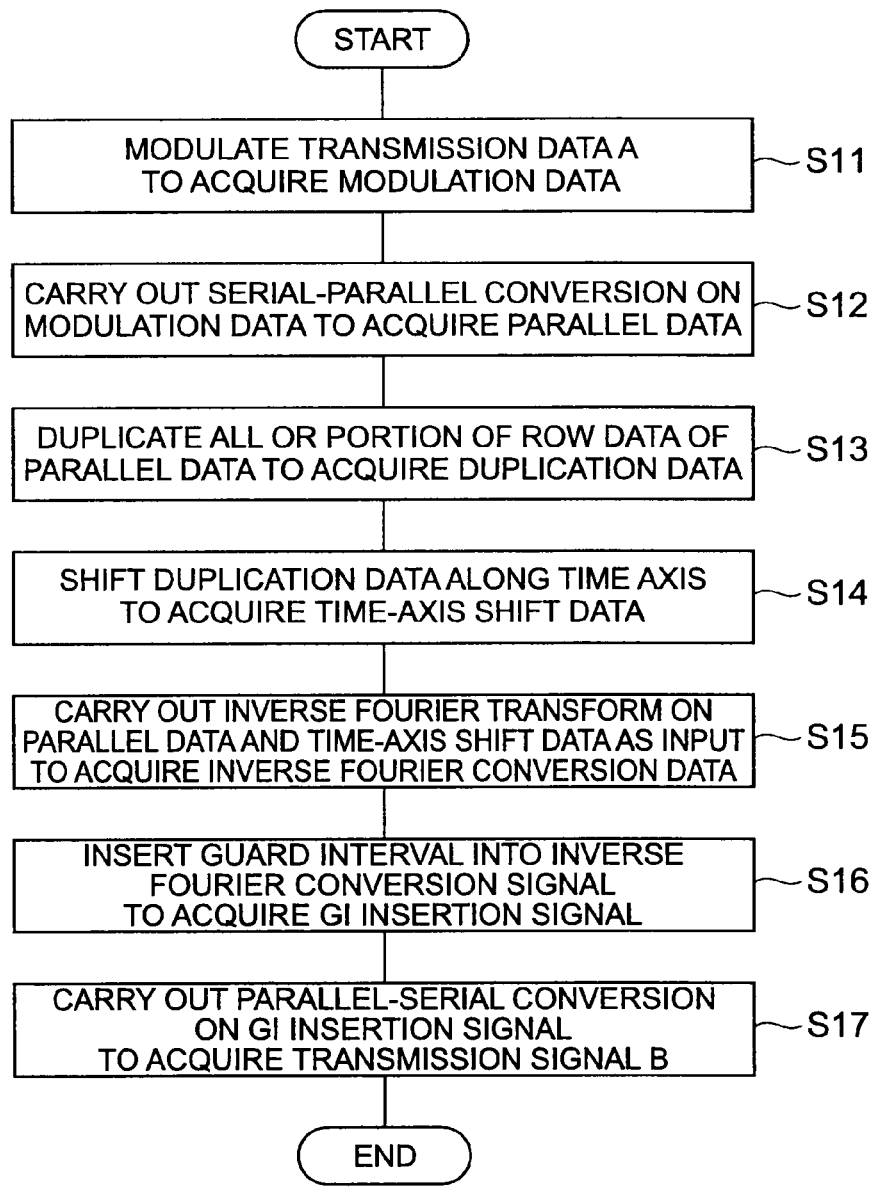
FIG. 2 is a flowchart showing signal generation processing according to the first and fourth embodiment.

Subsequently, description will be provided as to processing (hereinafter, referred to as "signal generation processing") based on a signal generation method according to an aspect of the invention, which is executed by the signal generation device 1 of the first embodiment. FIG. 2 shows a procedure relating to signal generation processing in the signal generation device 1.

In the signal generation processing of this embodiment, in imparting characteristics of cyclostationarity to a signal, first, the modulation unit 10 of the signal generation device 1 modulates transmission data A to acquire modulation data (Step S11 of FIG. 2: modulation step). Modulation data is input to the serial-parallel conversion unit 11 in series. The serial-parallel conversion unit 11 parallel-converts the modulation data input in series to acquire parallel data (Step S12: serial-parallel conversion step). Acquired parallel data is input to the duplication unit 12 and also to the inverse Fourier transform unit 14 through the duplication unit 12. The duplication unit 12 duplicates all or a portion of row data of the input parallel data to acquire duplication data (Step S13: duplication step). Acquired duplication data is input to the first time-axis shift unit 13. The first time-axis shift unit 13 shifts the duplication data along the time axis by a shift amount corresponding to a predefined imparted statistic to acquire time-axis shift data (Step S14: first time-axis shift step). Acquired time-axis shift data is input to the inverse Fourier transform unit 14.

The inverse Fourier transform unit 14 carries out fast inverse Fourier transform (IFFT) on the input parallel data and the time-axis shift data to acquire an inverse Fourier transform signal (Step S15: inverse Fourier transform step). The acquired inverse Fourier transform signal is input to the GI insertion unit 15. The GI insertion unit 15 inserts a GI (guard interval) into the inverse Fourier transform signal to acquire a GI insertion signal (Step S16). The acquired GI insertion signal is input to the parallel-serial conversion unit 16 in parallel. The parallel-serial conversion unit 16 serial-converts the GI insertion signal input in parallel to acquire and output a transmission signal B as a time domain signal (Step S17). With the above, the signal generation processing ends.

Subsequently, the effects of the first embodiment will be described. With the above-described signal generation processing, it is possible to generate a signal having characteristics of second-order cyclostationarity. Here, second-order cyclostationarity refers to a property mainly represented by a second-order cyclic autocorrelation function (CAF) and SCD (spectral correlation density).

Figure 3:
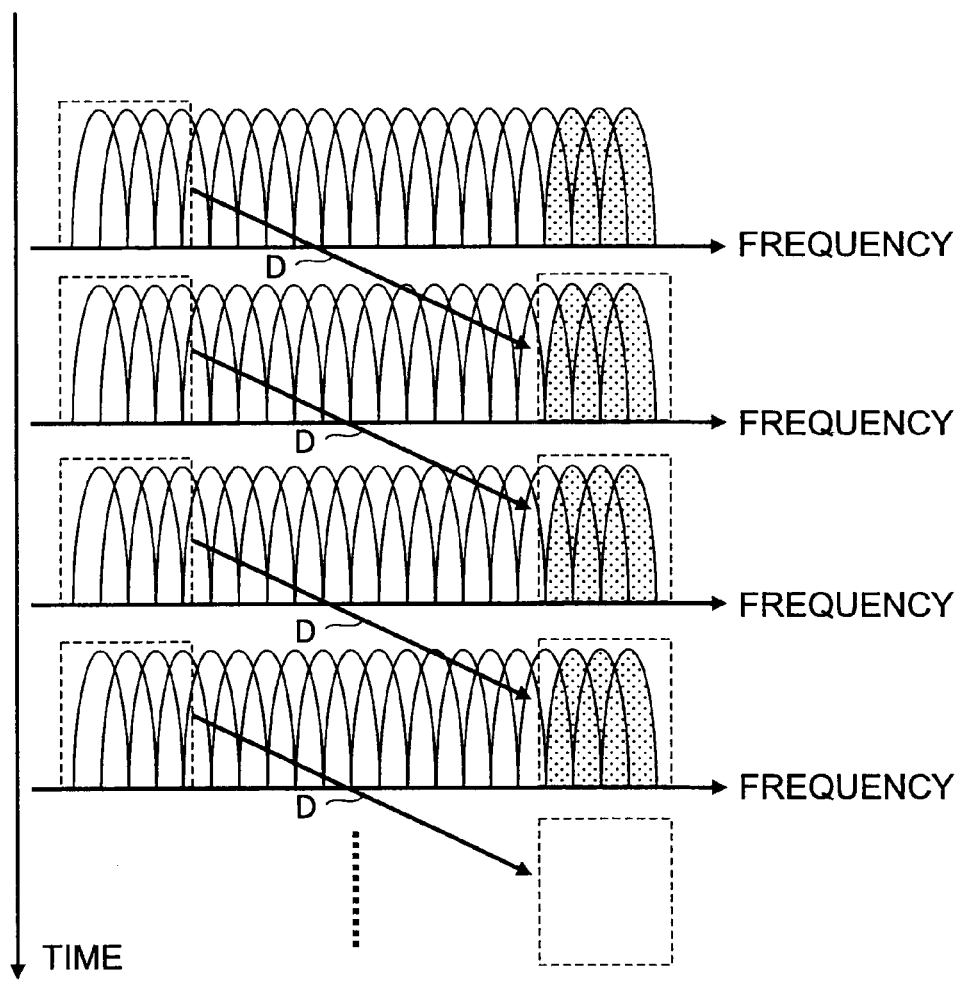
FIG. 3 is a diagram illustrating the effects of signal generation processing according to the first embodiment.

According to the invention, focusing on the cyclic autocorrelation function (hereinafter, referred to as "CAF"), multiple CAF peak pattern appear, thereby imparting characteristics second-order cyclostationarity. Here, CAF for a signal x[i] is defined by the following formula (1).

$$\tilde{R}_x^\alpha[v] = \frac{1}{I_0} \sum_{i=0}^{I_0-1} x[i] x^*[i+v] e^{-j\alpha i T_s} \quad (1)$$

x[i]: signal sampled at time $iT_s$
$T_s$: sampling interval
α: cycle frequency (frequency axis shift)
v: lag parameter (time axis shift)
$I_0$: observation time In the signal generation processing of the first embodiment, if the first time-axis shift unit 13 shifts the duplication data (duplicated symbols) along the time axis by one symbol, as shown in FIG. 3, samples marked with an arrow D have correlation. If the transmission signal B is received and CAF relating to the transmission signal B is calculated, when α in the above-described formula (1) is equal to the frequency interval between a duplication source and a duplication destination, and v is equal to a time shift amount corresponding to a shifted symbol time (in this case, one symbol), a CAF peak pattern appears.

Therefore, while there is no degree of freedom on the time axis in the method of the related art, according to the first embodiment, the degree of freedom on the time axis can be provided, making it possible to impart various characteristics of second-order cyclostationarity in accordance with a shift amount along the time axis.

(Modification of First Embodiment)

Figure 4:
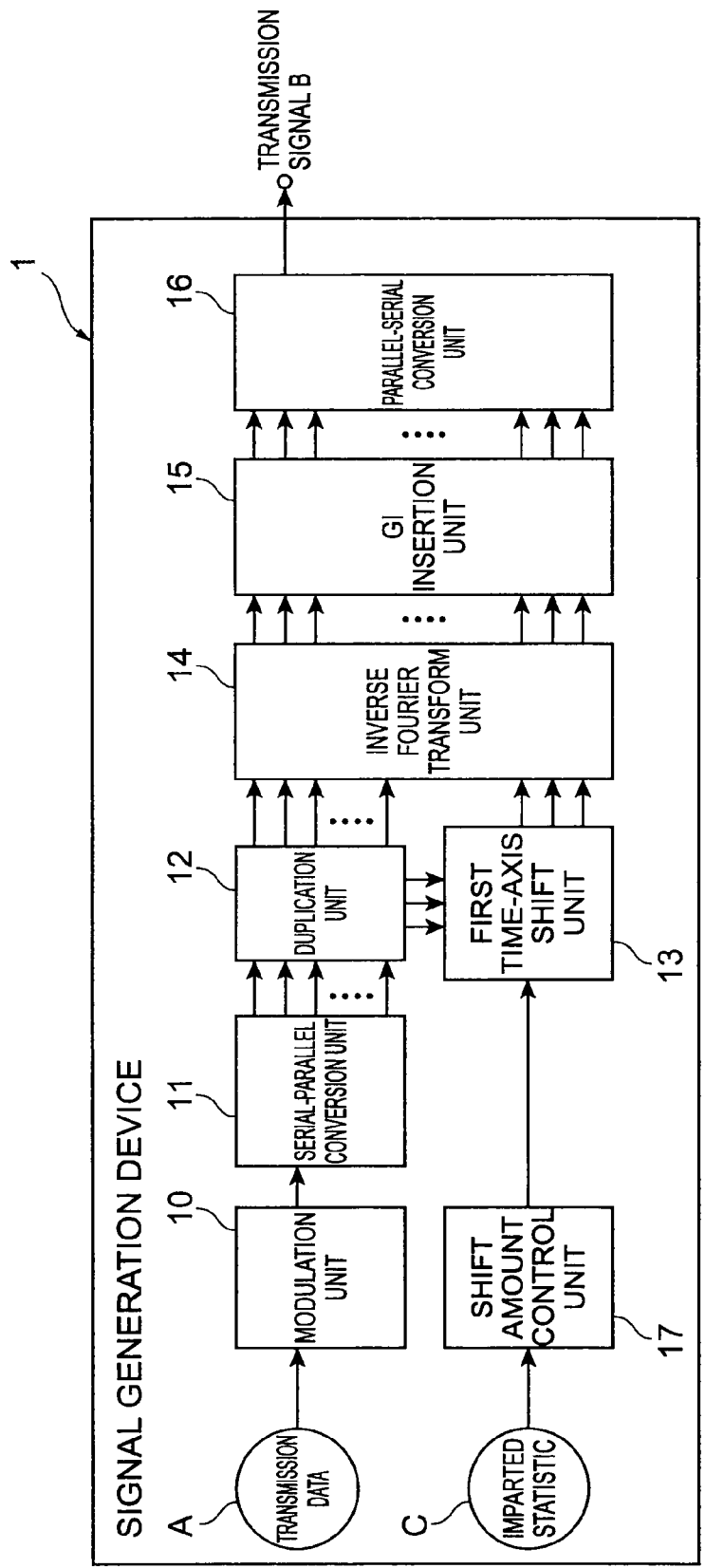
FIG. 4 is a block diagram showing the functional configuration of a signal generation device according to a modification of the first embodiment.

Subsequently, a modification of the signal generation device of the first embodiment will be described. In this modification, as shown in FIG. 4, a shift amount control unit 17 is provided in the signal generation device 1. In the signal generation device 1, the shift amount control unit 17 calculates a shift amount along the time axis in accordance with information of an imparted statistic C input from the outside and outputs the calculation result to the first time-axis shift unit 13. Thus, the first time-axis shift unit 13 carries out an operation to shift the duplication data along the time axis by the shift amount corresponding to the calculation result. This sequence of operations corresponds to a shift amount control step. According to the modification, characteristics of cyclostationarity which will appear vary in accordance with a control signal and the like from the outside including information of the imparted statistic C, making it possible to impart various characteristics of second-order cyclostationarity.

[Second Embodiment]

Figure 5:
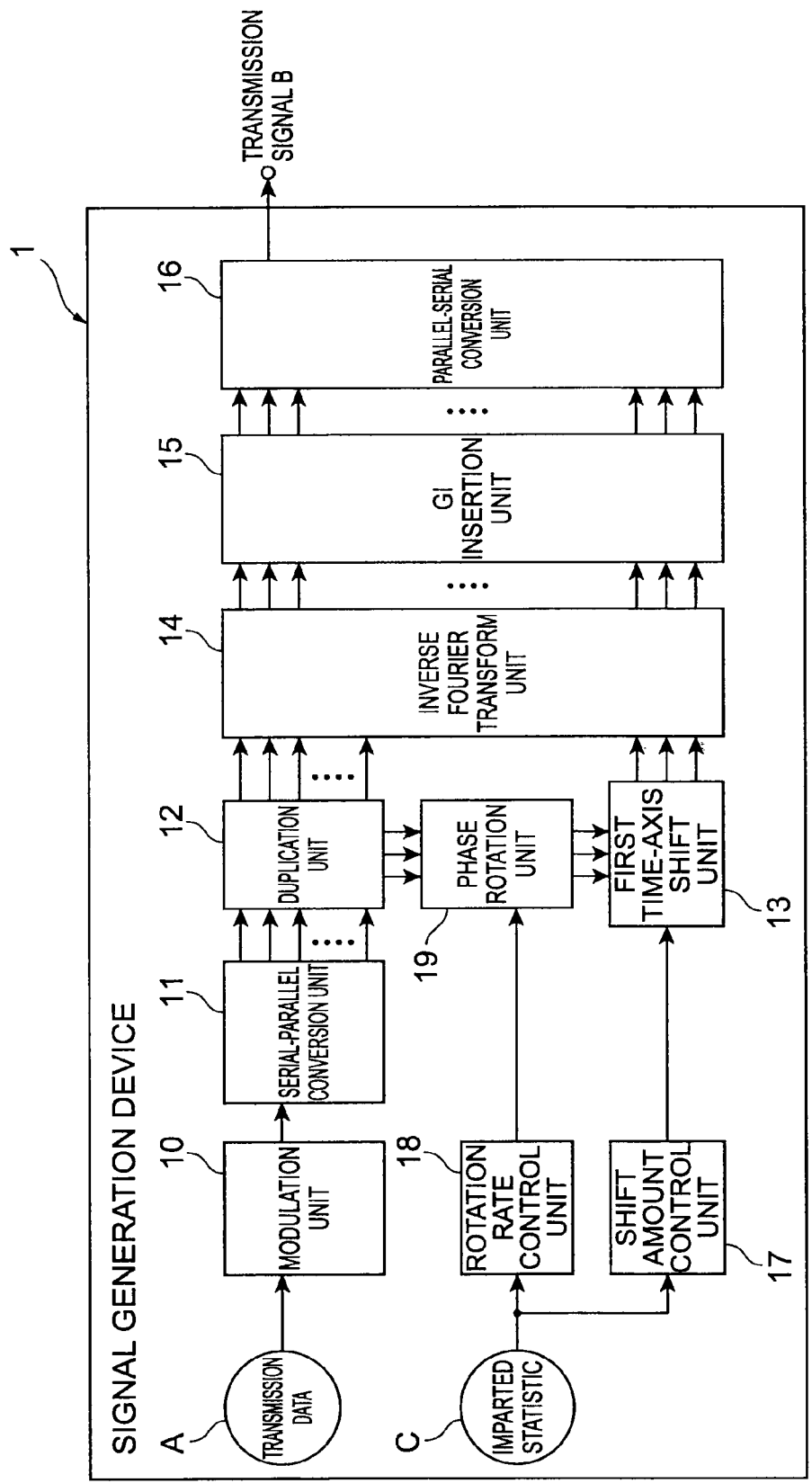
FIG. 5 is a block diagram showing the functional diagram of a signal generation device according to a second embodiment.

Next, the configuration of a signal generation device according to a second embodiment will be described. FIG. 5 is a block diagram showing the functional configuration of a signal generation device 1 according to the second embodiment. As shown in FIG. 5, the signal generation device 1 includes a modulation unit 10, a serial-parallel conversion unit 11, a duplication unit 12, a first time-axis shift unit 13, an inverse Fourier transform unit 14, a GI insertion unit 15, a parallel-serial conversion unit 16, a shift amount control unit 17, a rotation rate control unit 18, and a phase rotation unit 19.

Hereinafter, the respective functional elements will be described in detail with reference to FIG. 5.

The modulation unit 10 modulates transmission data A to obtain modulation data. Here, modulation refers to a technique for mapping transmission data on a signal space constituted by an in-phase component and an orthogonal component in accordance with a modulation method, such as phase modulation (BPSK, QPSK, or the like), amplitude modulation (PAM or the like), or quadrature amplitude modulation (QAM). The serial-parallel conversion unit 11 parallel-converts the modulation data obtained by and output in series from the modulation unit 10 to generate parallel data. The duplication unit 12 duplicates all or a portion of row data of a matrix given as the parallel data, to obtain duplication data.

The phase rotation unit 19 multiplies each row of duplication data by a phase rotator, which undergoes phase rotation at a predetermined angular velocity, to obtain phase rotation data. The rotation rate control unit 18 controls the rotation rate of phase rotation in the phase rotation unit 19. That is, the rotation rate control unit 18 calculates the rotation rate of phase rotation in the phase rotation unit 19 in accordance with the input imparted statistic C and outputs the calculation result to the phase rotation unit 19. Thus, the phase rotation unit 19 carries out an operation to rotate the phase on that basis of the calculated rotation rate. This sequence of operations corresponds to a rotation rate control step.

The first time-axis shift unit 13 shifts the input duplication data after phase rotation along the time axis to obtain time-axis shift data. The inverse Fourier transform unit 14 receives the parallel data output from the serial-parallel conversion unit 11 and the time-axis shift data output from the first time-axis shift unit 13 as an input, carries out inverse Fourier transform on the input signal, and outputs an obtained inverse Fourier transform signal.

The GI insertion unit 15 duplicates all elements in a predetermined number of rows from the rightmost (or the leftmost) of the matrix of the inverse Fourier transform signal and connects the duplicated elements to the inverse Fourier transform signal from the left (or right) in the row direction to insert a guard interval (GI), thereby obtaining a GI insertion signal. The parallel-serial conversion unit 16 converts the matrix input as the GI insertion signal to serial data and outputs an obtained transmission signal B.

The shift amount control unit 17 controls the shift amount in the first time-axis shift unit 13. That is, the shift amount control unit 17 calculates the shift amount in the first time-axis shift unit 13 in accordance with the input information of the imparted statistic C and outputs the calculation result to the first time-axis shift unit 13. Thus, the first time-axis shift unit 13 carries out an operation to shift duplication data along the time axis by the shift amount corresponding to the calculation result. This sequence of operations corresponds to a shift amount control step.

Figure 6:
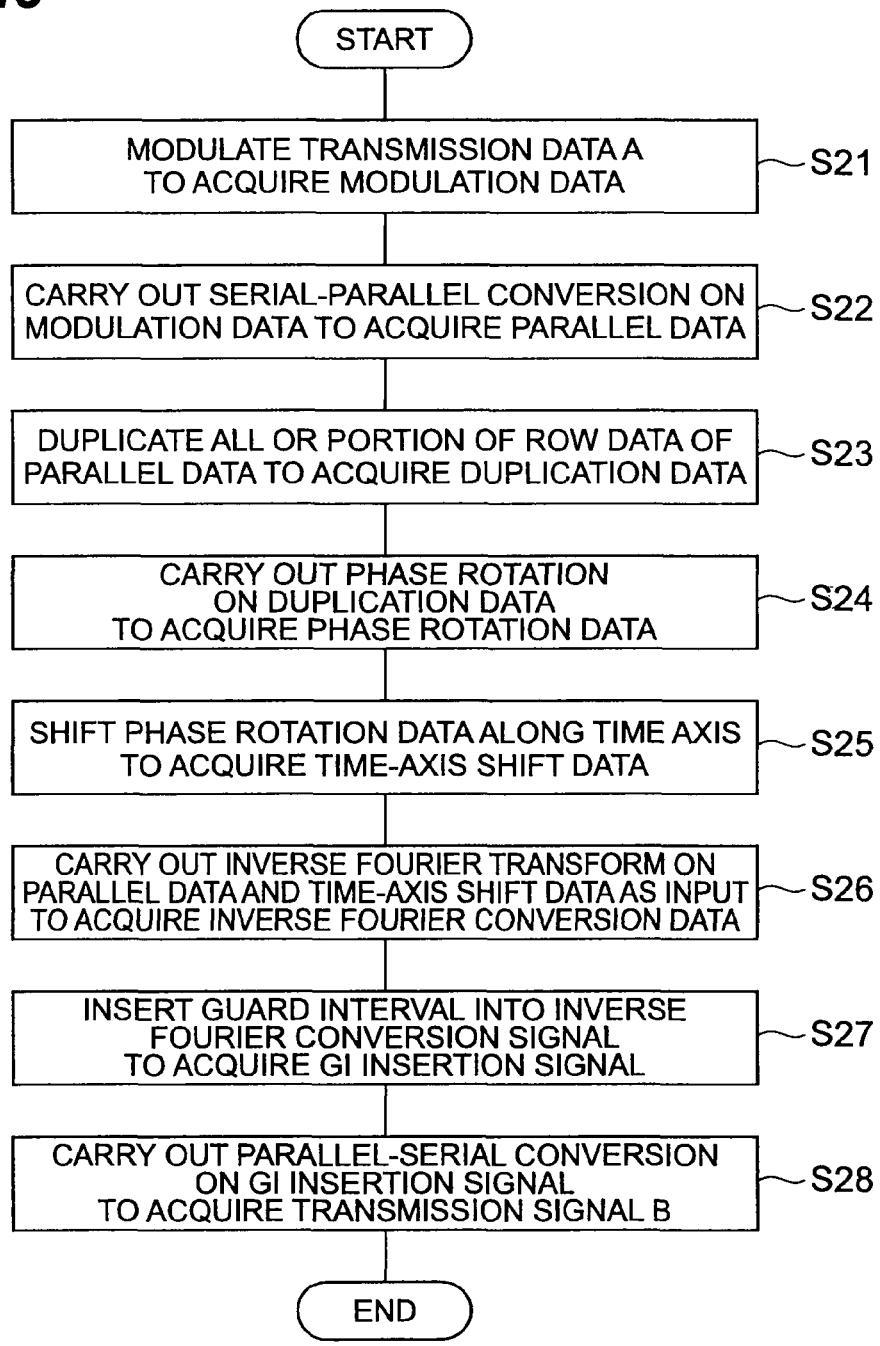
FIG. 6 is a flowchart showing signal generation processing according to the second embodiment.

Subsequently, description will be provided as to signal generation processing in the signal generation device 1 of the second embodiment. FIG. 6 shows a procedure relating to signal generation processing in the signal generation device 1.

In the signal generation processing of this embodiment, in imparting characteristics of cyclostationarity to a signal, first, the modulation unit 10 of the signal generation device 1 modulates transmission data A to acquire modulation data (Step S21 of FIG. 6: modulation step). Modulation data is input to the serial-parallel conversion unit 11 in series. The serial-parallel conversion unit 11 parallel-converts the modulation data input in series to acquire parallel data (Step S22: serial-parallel conversion step). Acquired parallel data is input to the duplication unit 12 and also to the inverse Fourier transform unit 14 through the duplication unit 12. The duplication unit 12 duplicates all or a portion of row data of the input parallel data to acquire duplication data (Step S23: duplication step). Acquired duplication data is input to the phase rotation unit 13.

The phase rotation unit 13 rotates the phase of signals of the duplication data at a predetermined angular velocity to acquire phase rotation data (Step S24: phase rotation step). Acquired phase rotation data is input to the first time-axis shift unit 13. The first time-axis shift unit 13 shifts the input phase rotation data (that is, duplication data after phase rotation) along the time axis to acquire time-axis shift data (Step S25: first time-axis shift step). Acquired time-axis shift data is input to the inverse Fourier transform unit 14. The inverse Fourier transform unit 14 carries out fast inverse Fourier transform (IFFT) on the input parallel data and the time-axis shift data to acquire an inverse Fourier transform signal (Step S26: inverse Fourier transform step). The acquired inverse Fourier transform signal is input to the GI insertion unit 15. The GI insertion unit 15 inserts a GI (guard interval) into the inverse Fourier transform signal to acquire a GI insertion signal (Step S27). The acquired GI insertion signal is input to the parallel-serial conversion unit 16 in parallel. The parallel-serial conversion unit 16 serial-converts the GI insertion signal input in parallel to acquire and output a transmission signal B as a time domain signal (Step S28). With the above, the signal generation processing ends.

Subsequently, the effects of the second embodiment will be described. With the above-described signal generation processing, it is possible to generate signals having characteristics of second-order cyclostationarity. As described above, according to the invention, focusing on CAF from among the statistics (SCD and CAF) relating on second-order cyclostationarity, multiple CAF peak patterns appear, thereby imparting various characteristics of second-order cyclostationarity.

That is, with the signal generation processing of the second embodiment, when α in the formula (1) representing "CAF of the signal x[i]"="the frequency interval between the duplication source and the duplication destination"+"the frequency shift amount corresponding to the phase rotation rate", and ν is equal to a time shift amount corresponding to a shifted symbol time, a CAF peak pattern appears. Thus, in addition to the time shift amount, the frequency shift amount corresponding to the rotation rate at which the phase of the signal point is rotated is set as a variation factor, making it possible to impart various characteristics of cyclostationarity.

[Third Embodiment]

Figure 7:
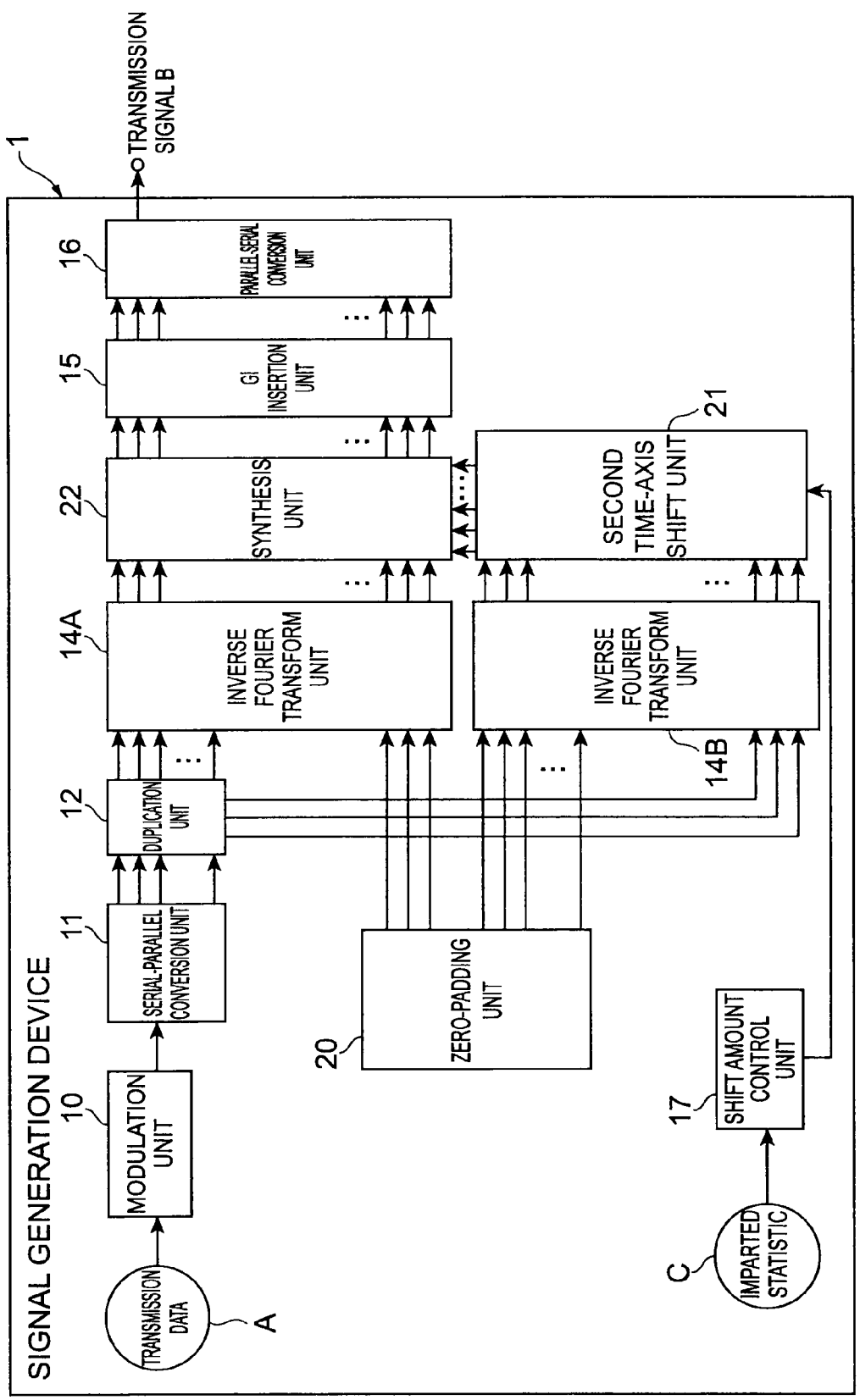
FIG. 7 is a block diagram showing the functional configuration of a signal generation device according to a third embodiment.

Next, the configuration of a signal generation device according to a third embodiment will be described. FIG. 7 is a block diagram showing the functional configuration of a signal generation device 1 according to the third embodiment. As shown in FIG. 7, the signal generation device 1 includes a modulation unit 10, a serial-parallel conversion unit 11, a duplication unit 12, inverse Fourier transform units 14A and 14B, a GI insertion unit 15, a parallel-serial conversion unit 16, a shift amount control unit 17, a zero-padding unit 20, and a second time-axis shift unit 21.

Hereinafter, the respective functional elements will be described in detail with reference to FIG. 7.

The modulation unit 10 modulates transmission data A to obtain modulation data. Here, modulation refers to a technique for mapping transmission data on a signal space constituted by an in-phase component and an orthogonal component in accordance with a modulation method, such as phase modulation (BPSK, QPSK, or the like), amplitude modulation (PAM or the like), or quadrature amplitude modulation (QAM). The serial-parallel conversion unit 11 parallel-converts the modulation data obtained by and output in series from the modulation unit 10, to generate parallel data. The duplication unit 12 selects all or a portion of row data of a matrix given as the parallel data and duplicates the selected parallel data to obtain duplication data.

The inverse Fourier transform units 14A and 14B receive the parallel data output from the serial-parallel conversion unit 11 and the time-axis shift data output from the first time-axis shift unit 13 as an input, carries out inverse Fourier transform on the input signal, and outputs an obtained inverse Fourier transform signal. The zero-padding unit 20 carries out processing for burying zero in the input signal (the parallel data and the time-axis shift data) which will be subjected to inverse Fourier transform in the inverse Fourier transform units 14A and 14B.

Here, as an example, duplication data of the selected parallel data (in this case, row data selected in the matrix given as parallel data) is input from the duplication unit 12 to the inverse Fourier transform unit 14B, and data in which zero is buried in a row not selected in the duplication unit 12 is input from the zero-padding unit 20 to the inverse Fourier transform unit 14B. The inverse Fourier transform unit 14B carries out inverse Fourier transform on the input signal (that is, the zero-padded duplication data) having the duplication data of the selected row and the data of the row with zero buried.

Meanwhile, the parallel data (in this case, data of an unselected row in the matrix given as parallel data) which is not selected as a duplication target in the duplication unit 12 is input from the duplication unit 12 to the inverse Fourier transform unit 14A, and the data in which zero is buried in the row selected in the duplication unit 12 is input from the zero-padding unit 20 to the inverse Fourier transform unit 14A. The inverse Fourier transform unit 14A carries out inverse Fourier transform on the input signal (that is, the zero-padded parallel data) having the parallel data of the unselected row and data of the row (selected row) with zero buried. As another example, parallel data of all the rows may be input from the duplication unit 12 to the inverse Fourier transform unit 14A, and the inverse Fourier transform unit 14A may substitute the data of the row selected in the duplication unit 12 from among the parallel data of all the rows with zero to form the same zero-padded parallel data as described above and may carry out inverse Fourier transform on the zero-padded parallel data.

The second time-axis shift unit 21 shifts the inverse Fourier transform signal output from the inverse Fourier transform unit 14B along the time axis. Specifically, the second time-axis shift unit 21 circularly shifts the samples of the inverse Fourier transform signal to acquire time-axis shift data shifted along the time axis in terms of samples.

The shift amount control unit 17 controls the shift amount in the second time-axis shift unit 21. That is, the shift amount control unit 17 calculates the shift amount in the second time-axis shift unit 21 in accordance with input information of the imparted statistic C and outputs the calculation result to the second time-axis shift unit 21. Thus, the second time-axis shift unit 21 carries out an operation to shift the inverse Fourier transform signal from the inverse Fourier transform unit 14B along the time axis by the shift amount corresponding to the calculation result.

However, it is not essential to provide the shift amount control unit 17 in the signal generation device 1. For example, the shift amount control unit 17 may not be provided in the signal generation device 1, and the second time-axis shift unit 21 may store a shift amount corresponding to a predefined imparted statistic in advance and may execute a shift along the time axis on the basis of the shift amount.

The synthesis unit 22 synthesizes the inverse Fourier transform signal output from the inverse Fourier transform unit 14A and the inverse Fourier transform signal after the shift in the second time-axis shift unit 21. The GI insertion unit 15 duplicates all elements in a predetermined number of rows from the rightmost (or the leftmost) of the matrix of the inverse Fourier transform signal and connects the duplicated elements to the inverse Fourier transform signal from the left (or right) in the row direction to insert a guard interval (GI), thereby obtaining a GI insertion signal. The parallel-serial conversion unit 16 converts the matrix input as the GI insertion signal to serial data and outputs an obtained transmission signal B.

Figure 8:
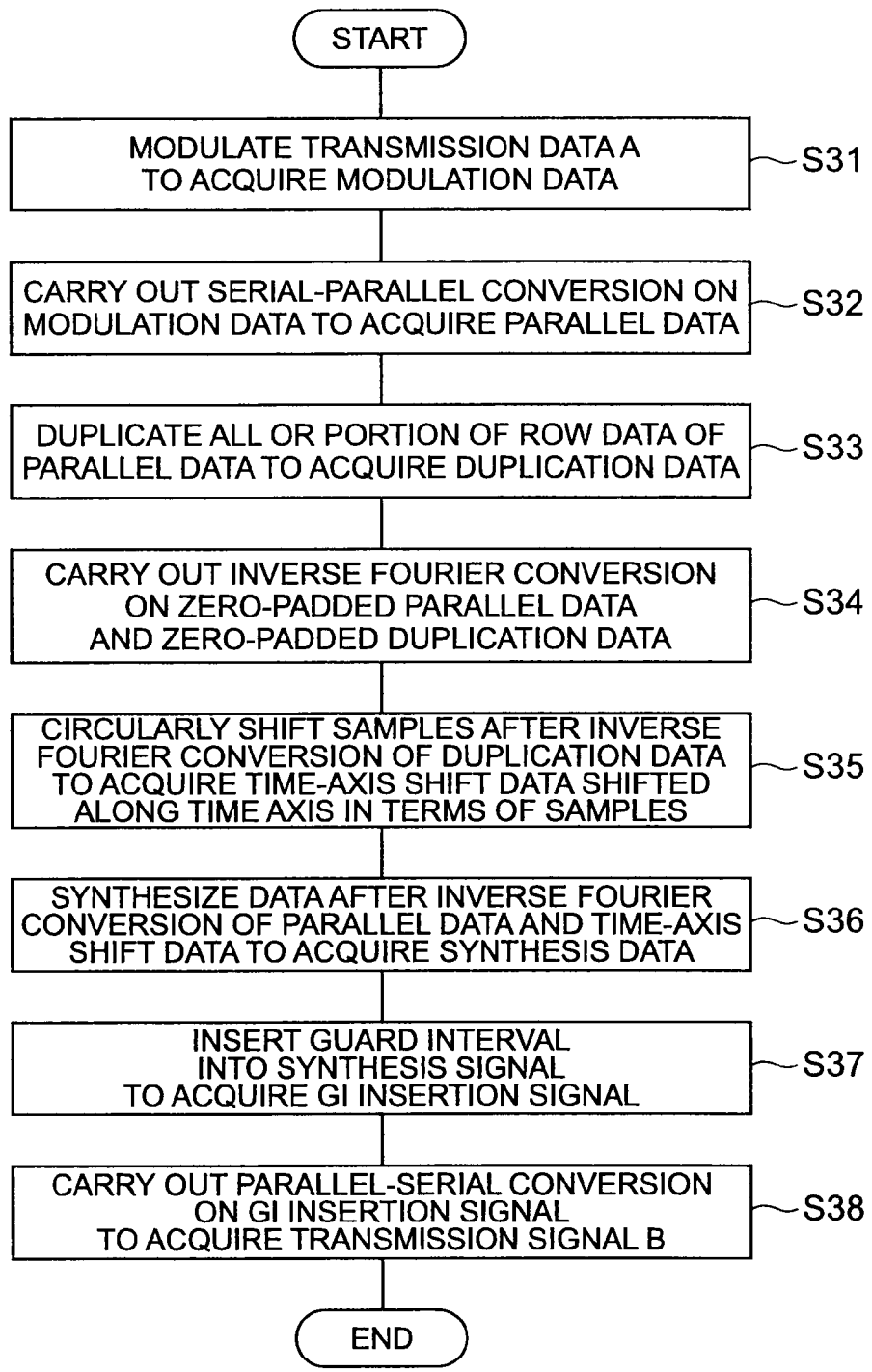
FIG. 8 is a flowchart showing signal generation processing according to the third embodiment.

Subsequently, description will be provided as to signal generation processing in the signal generation device 1 of the third embodiment. FIG. 8 shows a procedure relating to signal generation processing in the signal generation device 1.

In the signal generation processing of this embodiment, in imparting characteristics of cyclostationarity to a signal, first, the modulation unit 10 of the signal generation device 1 modulates transmission data A to acquire modulation data (Step S31 of FIG. 8: modulation step). The modulation data is input to the serial-parallel conversion unit 11 in series. The serial-parallel conversion unit 11 parallel-converts the modulation data input in series to acquire parallel data (Step S32: serial-parallel conversion step). The acquired parallel data is input to the duplication unit 12 and also to the inverse Fourier transform unit 14 through the duplication unit 12. The duplication unit 12 selects all or a portion of row data of a matrix given as parallel data and duplicates the selected parallel data to acquire duplication data (Step S33: duplication step).

Here, the duplication data of the selected parallel data (in this case, data of the selected row in the matrix given as parallel data) is input from the duplication unit 12 to the inverse Fourier transform unit 14B, and data of a row in which zero is buried in the parallel data not selected in the duplication unit 12 is input from the zero-padding unit 20 to the inverse Fourier transform unit 14B. The inverse Fourier transform unit 14B carries out inverse Fourier transform on the input signal (that is, zero-padded duplication data) having the duplication data of the selected row and the data of the row (unselected row) with zero buried (Step S34: inverse Fourier transform step).

In Step S34, the parallel data (in this case, data of an unselected row in the matrix given as parallel data) not selected as a duplication target in the duplication unit 12 is input from the duplication unit 12 to the inverse Fourier transform unit 14A, and the data of the row in which zero is buried in the parallel data (in this case, data of the selected row) not selected in the duplication unit 12 is input from the zero-padding unit 20 to the inverse Fourier transform unit 14A. The inverse Fourier transform unit 14A carries out inverse Fourier transform on the input signal (that is, zero-padded parallel data having the parallel data of the unselected row and the data of the row (selected row) with zero buried.

The second time-axis shift unit 21 circularly shifts the samples of the inverse Fourier transform signal to acquire time-axis shift data (that is, an inverse Fourier transform signal after the shift is executed) shifted along the time axis in terms of samples (Step S35: second time-axis shift step).

The synthesis unit 22 synthesizes the inverse Fourier transform signal output from the inverse Fourier transform unit 14A and the inverse Fourier transform signal after the shift is executed in the second time-axis shift unit 21 to acquire a synthesis signal (Step S36: synthesis step). The acquired synthesis signal is input to the GI insertion unit 15.

The GI insertion unit 15 inserts a GI (guard interval) into the synthesis signal to acquire a GI insertion signal (Step S37). The acquired GI insertion signal is input to the parallel-serial conversion unit 16 in parallel. The parallel-serial conversion unit 16 serial-converts the GI insertion signal input in parallel to acquire and output a transmission signal B as a time domain signal (Step S38). With the above, the signal generation processing ends.

Subsequently, the effects of the third embodiment will be described. With the above-described signal generation processing, when α in the aforementioned formula (1) representing CAF of the signal x[i] is equal to the frequency interval between the duplication source and the duplication destination, and ν is equal to a time shift amount corresponding to the number of shifted samples, a CAF peak pattern appears. While in the foregoing first and second embodiments, the time shift amount varies in terms of symbols, in the third embodiment, the time shift amount can vary in terms of samples, making it possible to impart various characteristics of cyclostationarity.

[Fourth Embodiment]

Next, a fourth embodiment will be described.

The inventors have considered that "the samples of a signal after inverse Fourier transform are circularly shifted" corresponds to "phase rotation of symbols on the frequency axis". For example, when the number of subcarriers is N, if the number of samples which undergo a time shift is i, the phase rotation amount which should be given to an m-th subcarrier so as to be equivalent to a time shift when the number of samples is i is expressed by the following formula (2).

$$\text{Phase rotation amount which should be given to the m-th subcarrier} = \exp(-j2\pi i m/N) \quad (2)$$

The inventors have considered a fourth embodiment described below as the configuration for realizing a shift along the time axis in terms of samples on the basis of the above-described finding.

While the configuration of a signal generation device according to the fourth embodiment is the same as the configuration of FIG. 1, the processing which is executed by the first time-axis shift unit 13 is different from the first embodiment. That is, in the fourth embodiment, the first time-axis shift unit 13 applies phase rotation which differs between subcarriers, to information symbols transmitted by the respective subcarriers in the same symbol for duplication data duplicated by the duplication unit 12, thereby shifting the duplication data along the time axis in terms of samples.

Figure 9:
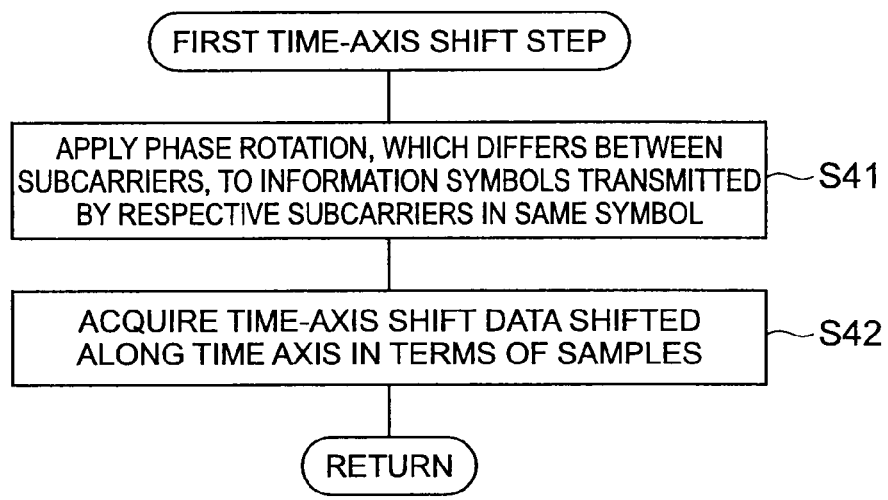
FIG. 9 is a flowchart showing processing of a first time-axis shift step according to a fourth embodiment.

While the signal generation processing of the fourth embodiment is the same as the procedure of FIG. 2, as shown in FIG. 9, the processing content in Step S14 (first time-axis shift step) of FIG. 2 is different from that of the first embodiment. That is, the first time-axis shift unit 13 applies phase rotation which differs between subcarriers, to information symbols transmitted by the respective subcarriers in the same symbol for duplication data duplicated by the duplication unit 12 (Step S41 of FIG. 9), thereby obtaining time-axis shift data shifted along the time axis in terms of samples (Step S42).

As described above, for duplication data, phase rotation which differs between subcarriers, is applied to information symbols transmitted by the respective subcarriers in the same symbol, thereby acquiring the time-axis shift data shifted along the time axis in terms of samples. Therefore, it is possible to impart various characteristics of cyclostationarity.

Although in the first to fourth embodiments, an example of the OFDM system has been described where parallel data acquired by the serial-parallel conversion unit is input to the inverse Fourier transform unit, the invention is not limited to a signal generation device that employs the OFDM system and may be applied to all types of signal generation devices that employ a transmission method using inverse Fourier transform. For example, the invention may be applied to a signal generation device that employs an SC-FDMA (Single-Carrier FDMA) system.

The second embodiment corresponds to an example where, in the first embodiment (a time shift in terms of symbol time), a CAF peak position shift in the frequency direction is also applied by applying phase rotation which is common to the subcarriers. In this way, it is very effective that phase rotation for the CAF peak position shift in the frequency direction is added to the time shift. In the third and fourth embodiments (a time shift in terms of samples), the CAF peak position shift in the frequency direction may also be applied by applying phase rotation which is common to the subcarriers, making it possible to impart various characteristics of cyclostationarity. In this case, an application example to the fourth embodiment corresponds to an example where phase rotation which differs between the subcarriers is applied to realize a time shift in terms of samples, and phase rotation which is common to the carriers is applied to realize the CAF peak position shift in the frequency direction.

Figure 10:
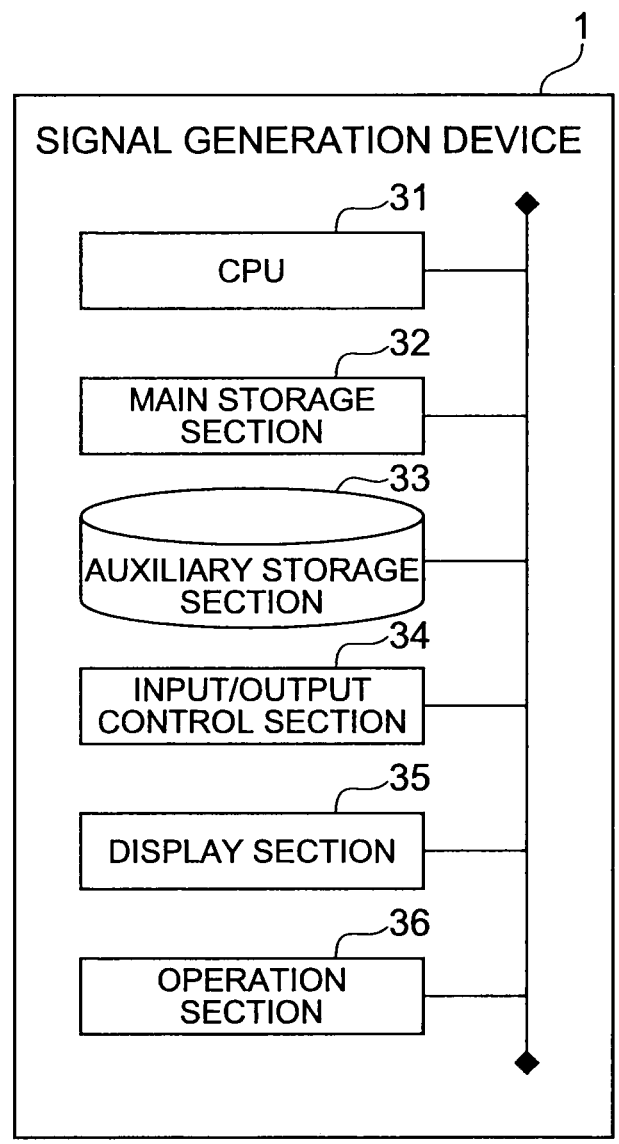
FIG. 10 is a block diagram showing an example of the hardware configuration of a signal generation device.

On the other hand, the hardware configuration of the signal generation device 1 according to each of the first to fourth embodiments may be constituted by a computer system which is capable of storing data or other arbitrary devices. For example, as shown in FIG. 10, the signal generation device 1 may include: a CPU 31 which executes an operating system, an application program, or the like; a main storage section 32 which is constituted by a ROM and a RAM; an auxiliary storage section 33 which is constituted by a nonvolatile memory or the like; an input/output control section 34 which controls data input/output with respect to the outside; a display section 35 which is constituted by a monitor or the like; and an operation section 36 which is constituted keys for inputting letters and numerals and for instructing execution.

What is claimed is:

1. A signal generation device that performs transmission using an inverse Fourier transform, the signal generation device comprising:
    a modulation unit configured to modulate transmission data to obtain modulation data;
    a serial-parallel conversion unit configured to convert the modulation data input in series from the modulation unit to parallel data of a predetermined size smaller than the size of a dimension of a matrix used in the inverse Fourier transform;
    a duplication unit configured to select and duplicate all or a portion of the parallel data obtained by the serial-parallel conversion unit, to obtain duplication data;
    a time-axis shift unit configured to shift input duplication data along the time axis to obtain time-axis shift data; and
    an inverse Fourier transform unit configured to carry out the inverse Fourier transform on the parallel data obtained by the serial-parallel conversion unit and the time-axis shift data obtained by the time-axis shift unit.

2. The signal generation device according to claim 1, further comprising a shift amount control unit configured to control the shift amount in the time-axis shift unit.

3. The signal generation device according to claim 1, further comprising:
    a phase rotation unit configured to rotate the phase of a signal point at a predetermined rate for the duplication data duplicated by the duplication unit and output the duplication data with the phase rotated to the time-axis shift unit; and
    a rotation rate control unit configured to control the rotation rate at which the phase of the signal point is rotated by the phase rotation unit.

4. The signal generation device according to claim 1, wherein the time-axis shift unit is configured to shift the duplication data along the time axis in terms of samples by applying phase rotation, which differs between subcarriers, to information symbols transmitted by subcarriers in the same symbol for the duplication data duplicated by the duplication unit.

5. A signal generation device that performs transmission using an inverse Fourier transform, the signal generation device comprising:
    a modulation unit configured to modulate transmission data to obtain modulation data;
    a serial-parallel conversion unit configured to convert the modulation data input in series from the modulation unit to parallel data of a predetermined size smaller than the size of a dimension of a matrix used in the inverse Fourier transform;
    a duplication unit configured to select and duplicate all or a portion of the parallel data obtained by the serial-parallel conversion unit, to obtain duplication data;
    an inverse Fourier transform unit configured to carry out the inverse Fourier transform on the parallel data obtained by the serial-parallel conversion unit and the duplication data obtained by the duplication unit;
    a time-axis shift unit configured to circularly shift samples after the inverse Fourier transform of the duplication data to obtain time-axis shift data shifted along the time axis in terms of samples; and
    a synthesis unit configured to synthesize the time-axis shift data and data after the inverse Fourier transform of the parallel data.

6. A signal generation method which is executed by a signal generation device that performs transmission using an inverse Fourier transform, the signal generation method comprising:
    a modulation step of modulating transmission data to obtain modulation data;
    a serial-parallel conversion step of converting the modulation data obtained in the modulation step to parallel data of a predetermined size smaller than the size of a dimension of a matrix used in the inverse Fourier transform;
    a duplication step of selecting and duplicating all or a portion of the parallel data obtained in the serial-parallel conversion step, to obtain duplication data;
    a time-axis shift step of shifting input duplication data along the time axis to obtain time-axis shift data; and
    an inverse Fourier transform step of carrying out the inverse Fourier transform on the parallel data obtained in the serial-parallel conversion step and the time-axis shift data obtained in the time-axis shift step.

7. The signal generation method according to claim 6, further comprising:
    a shift amount control step of controlling the shift amount in the time-axis shift step.

8. The signal generation method according to claim 6, further comprising:
    a phase rotation step of rotating the phase of a signal point at a predetermined rate for the duplication data duplicated in the duplication step and outputting the duplication data with the phase rotated to the time-axis shift step; and
    a rotation rate control step of controlling the rotation rate at which the phase of the signal point is rotated in the phase rotation step.

9. The signal generation method according to claim 6,
    wherein, in the time-axis shift step, the signal generation device shifts the duplication data along the time axis in terms of samples by applying phase rotation, which differs between subcarriers, to information symbols transmitted by subcarriers in the same symbol for the duplication data duplicated by the duplication unit.

10. A signal generation method which is executed by a signal generation device that performs transmission using an inverse Fourier transform, the signal generation method comprising:
    a modulation step of modulating transmission data to obtain modulation data;
    a serial-parallel conversion step of converting the modulation data obtained in the modulation step to parallel data of a predetermined size smaller than the size of a dimension of a matrix used in the inverse Fourier transform;
    a duplication step of selecting and duplicating all or a portion of the parallel data obtained in the serial-parallel conversion step, to obtain duplication data;
    an inverse Fourier transform step of carrying out the inverse Fourier transform on the parallel data obtained in the serial-parallel conversion step and the duplication data obtained in the duplication step;
    a time-axis shift step of circularly shifting samples after the inverse Fourier transform of the duplication data to obtain time-axis shift data shifted along the time axis in terms of samples; and a synthesis step of synthesizing the time-axis shift data and data after the inverse Fourier transform of the parallel data.

* * * * *